United States Patent [19]

Mackey

[11] Patent Number: 5,352,764

[45] Date of Patent: * Oct. 4, 1994

[54] STEPWISE LINEAR MAGNETIC POLYMERS AND METHODS FOR PREPARATION THEREOF

[75] Inventor: Jack D. Mackey, Hawthorne, Calif.

[73] Assignee: Northrop Corporation, Los Angeles, Calif.

[ * ] Notice: The portion of the term of this patent subsequent to Oct. 12, 2010 has been disclaimed.

[21] Appl. No.: 144,163

[22] Filed: Oct. 26, 1993

Related U.S. Application Data

[63] Continuation of Ser. No. 57,278, May 4, 1993, which is a continuation of Ser. No. 866,913, Apr. 10, 1992, Pat. No. 5,252,730.

[51] Int. Cl.$^5$ ............... C08G 73/00; C08G 63/44
[52] U.S. Cl. ...................... 528/363; 528/9; 528/322; 528/331; 528/392
[58] Field of Search ............ 528/363, 392, 322, 331, 528/9

[56] References Cited

U.S. PATENT DOCUMENTS

| | | | |
|---|---|---|---|
| 3,687,863 | 8/1972 | Wacher | 252/300 |
| 4,001,179 | 1/1977 | Richter et al. | 260/45.75 B |
| 4,104,466 | 8/1978 | Tsuchida et al. | 542/433 |
| 4,413,131 | 11/1983 | Karanatsios | 548/461 |
| 4,605,607 | 8/1986 | Nikles et al. | 430/17 |
| 4,719,286 | 1/1988 | Matlow | 528/362 |
| 4,746,735 | 5/1988 | Kruper, Jr. et al. | 540/145 |
| 4,783,529 | 11/1988 | Lavalee et al. | 540/145 |
| 4,784,736 | 11/1988 | Lonsdale et al. | 204/157.15 |
| 4,822,899 | 4/1989 | Groves et al. | 549/533 |
| 4,908,442 | 3/1990 | Narang et al. | 540/145 |
| 5,252,730 | 10/1993 | Mackey | 540/140 |

FOREIGN PATENT DOCUMENTS

| | | | |
|---|---|---|---|
| 62-63586 | 3/1987 | Japan | 540/145 |
| 3222172 | 9/1988 | Japan | 540/145 |
| 3222173 | 9/1988 | Japan | 540/145 |
| 3095183 | 4/1991 | Japan | 540/145 |
| 9107406 | 5/1991 | PCT Int'l Appl. | 540/145 |
| 9110667 | 7/1991 | PCT Int'l Appl. | 540/145 |

OTHER PUBLICATIONS

Gruetzmacher, Chemical Abstracts, vol. 105, p. 81 #116547Z, Jun. 1986.
Katritzky, et al., J. Heterocyclic Chem., vol. 25, PP. 1287-1292, Sep.-Oct. 1988.

*Primary Examiner*—John Kight, III
*Assistant Examiner*—Shelley A. Dodson
*Attorney, Agent, or Firm*—Terry J. Anderson; Karl J. Hoch, Jr.

[57] ABSTRACT

A stepwise linear polymer composition having intense magnetic properties and a method for preparation of same. A phthalimide compound and an aromatic dialiphatic acid are reacted in the presence of an acetate of monovalent metal at elevated temperatures to form a phenylenebis diphthalimidine compound. The phenylenebis diphthalimidine compound is then reacted with 3-benzylidine phthalimidine and a metal salt of an aliphatic acid at elevated temperatures under an inert gas to form the intensely magnetic polymer. The reactions may be carried out in the presence of a solvent.

14 Claims, No Drawings

STEPWISE LINEAR MAGNETIC POLYMERS AND METHODS FOR PREPARATION THEREOF

CROSS-REFERENCE TO RELATED APPLICATIONS

This is a continuation of commonly assigned application Ser. No. 08/057,278 filed May 4, 1993 now pending, which is a continuation of commonly assigned application Ser. No. 07/866,913, filed Apr, 10, 1992, now U.S. Pat. No. 5,252,730 issued on Oct. 12, 1993.

BACKGROUND OF THE INVENTION

1. Field of the Invention

The present invention relates to novel polymeric materials having strong natural magnetic properties and potential electroconductive properties, and to processes for the production thereof. The invention also relates to the preparation of novel diphthalimidine compounds for the preparation of the present magnetic polymers.

2. Description of the Prior Art

Polymerizable metal porphyrin macrocyclic monomers and linear polymers thereof are known from U.S. Pat. No. 4,908,442. Such monomers are tetraketo compounds which condense with tetra functional compounds, such as tetramines, to form conductive polymers which are useful as liquid crystals and in non-linear optical devices.

The preparation of tetraphenylporphyrins and the nitration thereof is disclosed in U.S. Pat. No. 4,746,735.

U.S. Pat. Nos. 4,104,466 and 4,605,607 each disclose porphyrin polymeric metal complexes which differ from those of the present invention.

U.S. Pat. No. 4,719,286 discloses electroconductive polymers which include porphyrin macrocycles, and U.S. Pat. No. 4,104,466 discloses polymeric composite metal complex materials from metal porphyrin monomers.

The aforementioned polymers are not known to have magnetic properties or to be useful as radar-absorbing materials. The prior art is not known to teach or suggest a stepwise linear polymer having magnetic properties.

SUMMARY OF THE INVENTION

The present invention relates to the production of a new class of organic polymeric materials which possess intense inherent magnetic properties, and which provide light-weight composite substitutes for known radar absorbing material (RAM) composite materials. The present magnetic polymers can also be doped to render them electrically-conductive. Thus they are suitable for a wide variety of applications where non-metallic, light weight, magnetic polymers and composites thereof are required.

This invention involves the discovery that magnetic polyporphyrin polymers can be produced by reacting a novel 1,4-phenylenebis diphthalimidine alone, or in combination with 3-benzylidine phthalimidine, and a metal salt of an aliphatic acid, in the presence of polyvalent metal ions, in proper molar proportions and under suitable reaction conditions, to produce a solid polymeric material which can be ground to a powder which exhibits intense magnetic properties. Where the reaction includes 3-benzylidine phthalimidine, linear magnetic polymers are formed. Where the reaction excludes 3-benzylidine phthalimidine, the magnetic polymers are crosslinked. The invention also involves the discovery that the novel 1,4-phenylenebis diphthalimidine starting reactant can be prepared by reacting phthalimide with 1,4-phenylene diacetic acid in the presence of a monovalent metal catalyst such as sodium acetate and under certain reaction conditions to produce the solid phenylenebis diphthalimidine compound which is capable of being pulverized to powder form.

This invention also involves the discovery that stepwise linear magnetic polyporphyrin polymers can be produced by reacting a novel 1,3-phenylenebis diphthalimidine under the aforementioned conditions in place of the novel 1,4-phenylenebis diphthalimidine, and that the novel 1,3-phenylenebis diphthalimidine can be prepared by reacting phthalimide with 1,3-phenylene diacetic acid, in the manner described above, in place of the 1,4-phenylene diacetic acid.

DETAILED DESCRIPTION

The preparation of the novel magnetic polymers of the present invention is dependent upon the starting reactants, two of which are novel materials which are produced according to two embodiments of the invention. Thus, the present polyporphyrin metal complex polymers are in one embodiment produced by reacting a novel 1,4-phenylenebis diphthalimidine compound alone or in combination with 3-benzylidine phthalimidine, and one or more ionizable metal salts which produce polyvalent metal ions and aliphatic acid ions in solution, such as nickel diacetate, under conditions which result in the formation of a linear magnetic metal complex porphyrin polymer having the structure

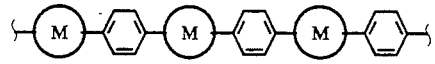

referred to as a poly (metal mesophenyl-tetrabenz porphyrin) wherein M is divalent metal, and

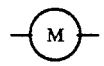

is a macrocyclic porphyrin moiety. The length of the polymer is dependent upon the reaction time and temperature.

The novel 1,4-phenylenebis diphthalimidine compound is initially prepared, according to an embodiment of the present invention, by reacting about 2 molar amounts of a phthalimide compound, such as phthalimide, with about 1 molar amount of an aromatic dialiphatic acid, such as 1,4-phenylene diacetic acid, in the presence of a monovalent metal catalyst, such as sodium acetate, according to the following:

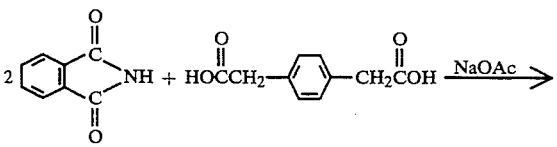

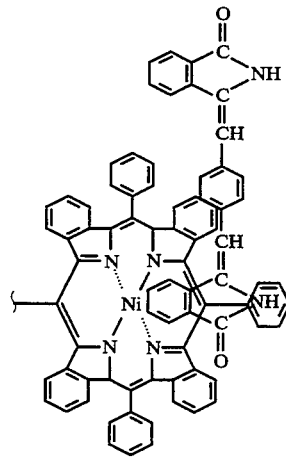

The aforementioned reaction is carried out by melting the reactants together and heating to between about 200° C. and 260° C. for about 1 to 3 hours, then cooling and solidifying the mix and extracting with ethyl alcohol. The insoluble solid 1,4-phenylenebis diphthalimidine is pulverized, filtered, and washed with ethyl alcohol.

In one embodiment, the present magnetic metal complex polyporphyrin polymers preferably are produced by reacting the aforementioned 1,4-phenylenebis diphthalimidine compound with 3-benzylidine phthalimidine and a divalent metal salt of an aliphatic acid, such as nickel diacetate, at elevated temperatures between about 300° C. and 380° C. and under an inert gas atmosphere, to form the solid polymer which can be pulverized to a magnetic powder.

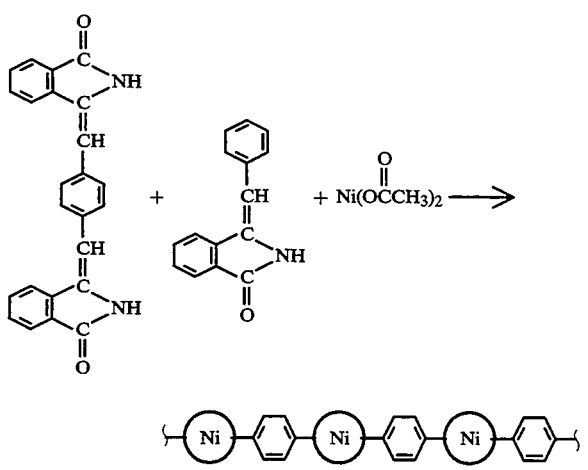

with the phenylene-linked nickel macrocyclic moiety having the structure:

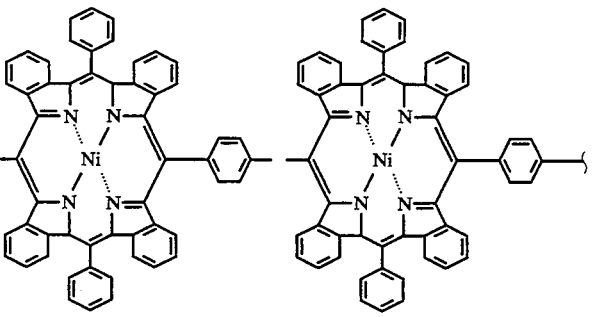

The formed polymer is a poly(nickel) tetrabenzporphyrin, wherein

—(Ni)— represents nickel mesophenyl tetrabenzporphyrin macrocycle moieties. The length of the formed polymer is dependent upon molar ratios, the reaction time and temperature.

The aforementioned reaction is given as illustrative and should not be considered as limitative. The molar ratios or reactants need not be limited as in the above reaction. The present magnetic polymers can be formed in the absence of the 3-benzylidine phthalimidine.

The present polymerization reaction preferably is carried out with the use of divalent metal acetate salts such as nickel, iron, cobalt, manganese and chromium acetates.

Trivalent metal acetate salts such as basic ferric acetate also may be employed. However, the magnetism does not appear to be developed to the extent as those observed with divalent acetates.

In cases where the aliphatic acid ions, such as acetate ions, are supplied by a salt other than of a polyvalent metal, such as sodium acetate, a second salt of a polyvalent metal, such as ferrous oxylate, must also be included to supply the polyvalent metal ions.

The aforementioned reactions may be carried out in a suitable solvent such as N-methylpyrrolidinone or dimethylformamide. In this case the polymer solubility (the extent of polymerization) and hence the magnetism can be easily mediated by reaction temperature and reaction time.

In cases where the magnetic polymers are formed in the absence of 3-benzylidine phthalimidine, it is preferable to react greater molar amounts of the 1,4-phenylenebis diphthalimidine, in proportion to the reacted molar amounts of the metal salt of the aliphatic acid, than is the case when the reaction includes 3-benzylidine phthalimidine, since in such reactions all benzpyrrole groups for the polymer must be supplied by the 1,4-phenylenebis diphthalimidine and not by the 1,4-phenylenebis diphthalimidine and 3-benzylidine phthalimidine in combination.

In a preferred reaction in the absence of 3-benzylidine phthalimidine, about three molar amounts of 1,4-phenylenebis diphthalimidine are reacted in proportion with about one molar amount of the metal salt of the aliphatic acid, to form the crosslinked magnetic polymer of the present invention.

It will be apparent to those skilled in the art that, from stoichiometric considerations, a proportion of at least two molar amounts of 1,4-phenylenebis diphthalimidine to one molar amount of the metal salt of the aliphatic acid are required to associate each metal ion with a formed moiety of the polymer.

It will also be apparent to those skilled in the art that, in the absence of the benzpyrrole groups of the 3-benzylidine phthalimidine, the metal macrocyclic moieties are crosslinked by the phenyl groups of the 1,4-phenylenebis diphthalimidine to adjacent moieties to form the crosslinked magnetic polymer.

As in the previous reactions, the 1,4-phenylenebis diphthalimidine and the metal salt of the aliphatic acid are reacted at elevated temperatures of between about 300° C. and about 380° C. under an inert atmosphere to form the solid magnetic polymer which is dried and pulverized to a magnetic powder. The following is representative of a suitable polymerization reaction forming a crosslinked magnetic polymer in the absence of the 3-benzylidine phthalimidine:

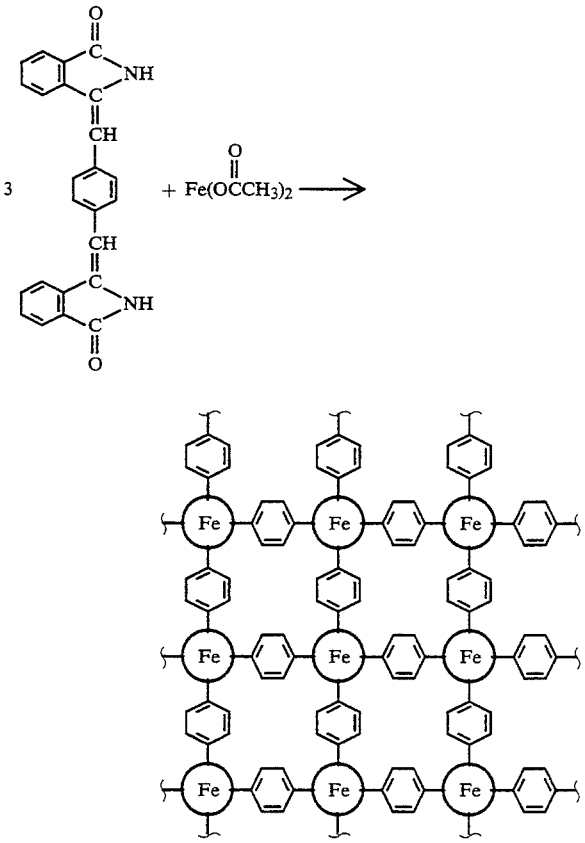

with the crosslinked iron macrocyclic moieties

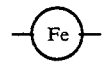

having the structure:

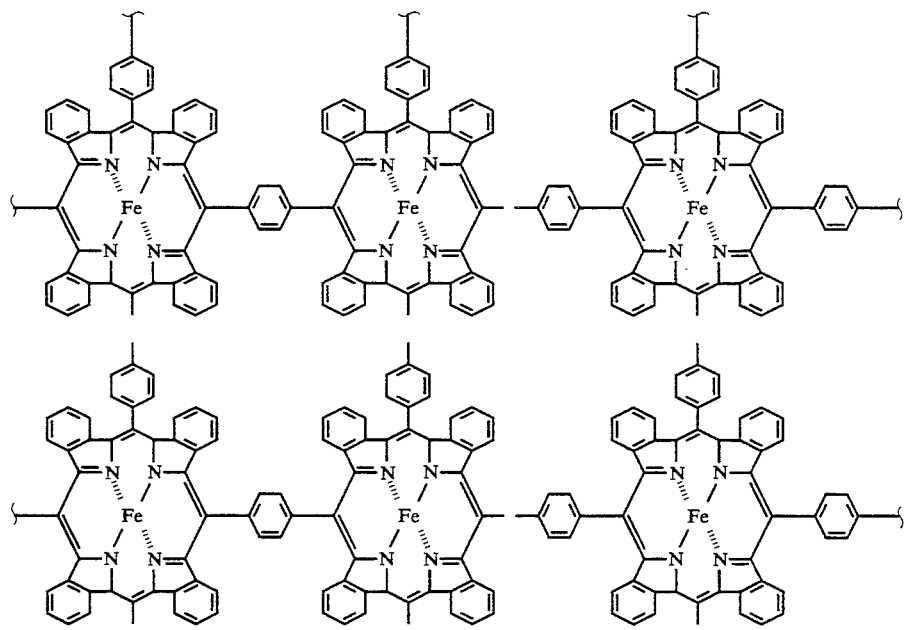

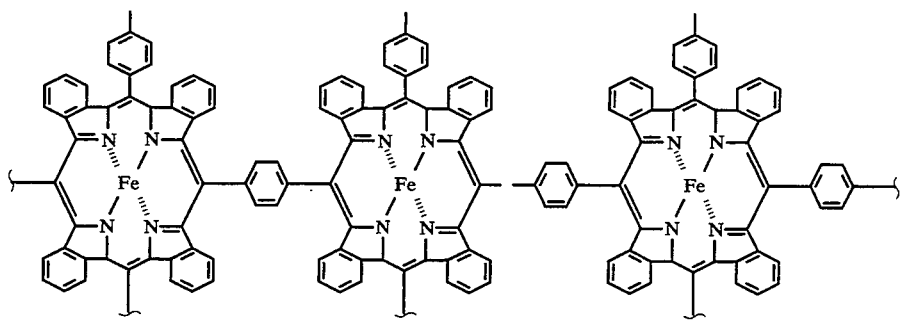

The aforementioned reaction is illustrative, and should not be considered as limitative. The size of the formed crosslinked polymer is dependent upon the molar ratios of the reactants, the reaction time, and the reaction temperature. And, as noted above, the molar ratios of the reactants need not be limited as in the above reaction. It will be appreciated, however, that reactions in which less than two molar amounts of 1,4-phenylenebis diphthalimidine are reacted in proportion to one molar amount of the metal salt of the aliphatic acid will produce moieties which are incomplete, and a smaller polymer structure exhibiting less intense magnetic properties.

The above polymerization reaction is preferably carried out with the use of divalent metal acetate salts, such as nickel, iron, cobalt, manganese, and chromium acetates, but may also employ trivalent metal acetate salts such as basic ferric acetate.

As in the reactions employing 3-benzylidine phthalimidine, the aliphatic acid ions, such as acetate ions, can be supplied by a salt of a monovalent metal, such as sodium acetate, with the inclusion in the reaction of a second salt of a polyvalent metal, such as ferrous oxylate, to supply the polyvalent metal ions.

The aforementioned reactions without the 3-benzylidine phthalimidine may also be carried out in a suitable solvent such as N-methylpyrrolidinone or dimethylformamide, with polymer solubility, extent of polymerization, and magnetism being mediated by reaction temperature and reaction time.

The aforementioned reactions may also be carried out utilizing 1,3-phenylene diacetic acid in place of the 1,4-phenylene diacetic acid to produce a novel 1,3-phenylenebis diphthalimidine compound, and by reacting the novel 1,3-phenylenebis diphthalimidine compound alone or in combination with 3-benzylidine phthalimidine and one or more ionizable metal salts in the manner described above. Where such reactions include 3-benzylidine phthalimidine, a stepwise linear magnetic polymer is formed. As in the preceding discussion, the length of the polymer is dependent upon the reaction time and temperature.

The novel 1,3-phenylenebis diphthalimidine compound is initially prepared, according to an embodiment of the present invention, by reacting about 2 molar amounts of a phthalimide compound, such as phthalimide, with about 1 molar amount of 1,3-phenylene diacetic acid, in the presence of a monovalent metal catalyst, such as sodium acetate, according to the following:

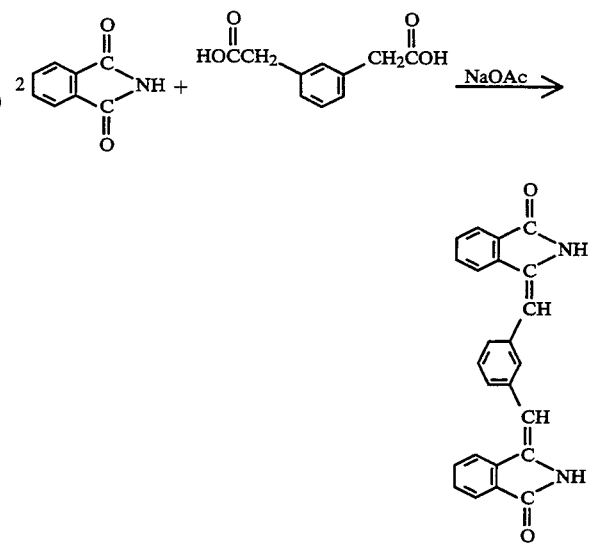

The aforementioned reaction is carried out by melting the reactants together and heating at between about 200° to about 260° C. until the solution begins to effervesce and turns dark orange. Heating is continued for between about 45 minutes and about three hours, followed by cooling and solidifying the mix and extracting with ethyl alcohol and then with acetone. The insoluble solid 1,3-phenylenebis diphthalimidine is pulverized, filtered, and washed with acetone.

The present stepwise linear magnetic metal complex polyporphyrin polymers preferably are produced by reacting the aforementioned 1,3-phenylenebis diphthalimidine compound with 3-benzylidine phthalimidine and a divalent metal salt of an aliphatic acid, such as ferrous diacetate, at a temperature of between about 260° C. and about 380° C. under an inert gas atmosphere for about one hour. Dimethylformamide is added to dissolve the solid polymer which is precipitated in acetone and pulverized to provide the magnetic powder. The following is representative of a suitable polymerization reaction:

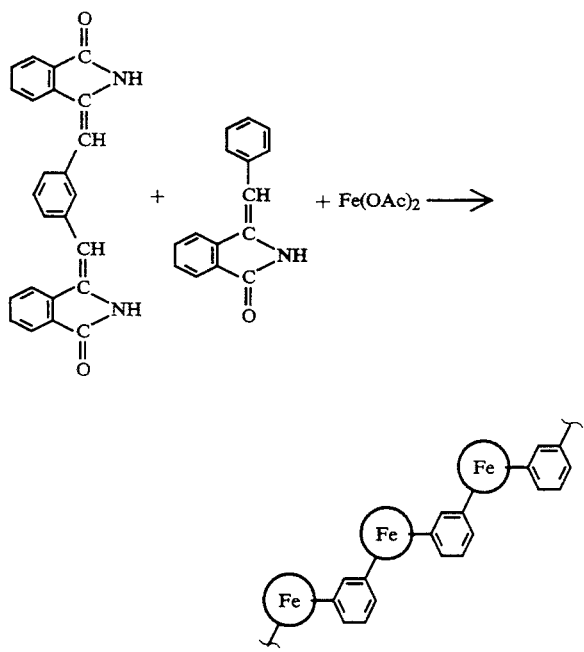

with the phenylene-linked iron macrocyclic moiety

having the structure:

represents iron mesophenyl tetrabenzporphyrin macrocycle moieties. The length of the formed polymer is dependent upon molar ratios, the reaction time and temperature.

The aforementioned reaction is given as illustrative and should not be considered as limitative. The molar ratios or reactants need not be limited as in the above reaction. The present stepwise linear magnetic polymers can be formed in the absence of the 3-benzylidine phthalimidine.

As in the earlier reactions, the polymerization reaction forming the stepwise linear magnetic polymers preferably is carried out with the use of divalent metal acetate salts such as nickel, iron, cobalt, manganese and chromium acetates.

Trivalent metal acetate salts such as basic ferric acetate also may be employed. As before, however, the magnetism does not appear to be developed to the extent as those observed with divalent acetates.

In cases where the aliphatic acid ions, such as acetate ions, are supplied by a salt other than of a polyvalent metal, such as sodium acetate, a second salt of a polyvalent metal, such as ferrous oxylate, must also be included to supply the polyvalent metal ions.

The reaction may also be carried out in a suitable solvent such as N-methylpyrrolidinone or dimethylformamide. In this case the polymer solubility (the extent of polymerization) and hence the magnetism can be easily mediated by reaction temperature and reaction time.

Where the 1,3-phenylenebis diphthalimidine is reacted as described above, without, however, the inclusion of 3-benzylidine phthalimidine, it is believed that the formed polymer is crosslinked similarly to the polymer formed by reacting the 1,4-phenylenebis diphthalimidine in the absence of 3-benzylidine phthalimidine, and exhibits the following structure:

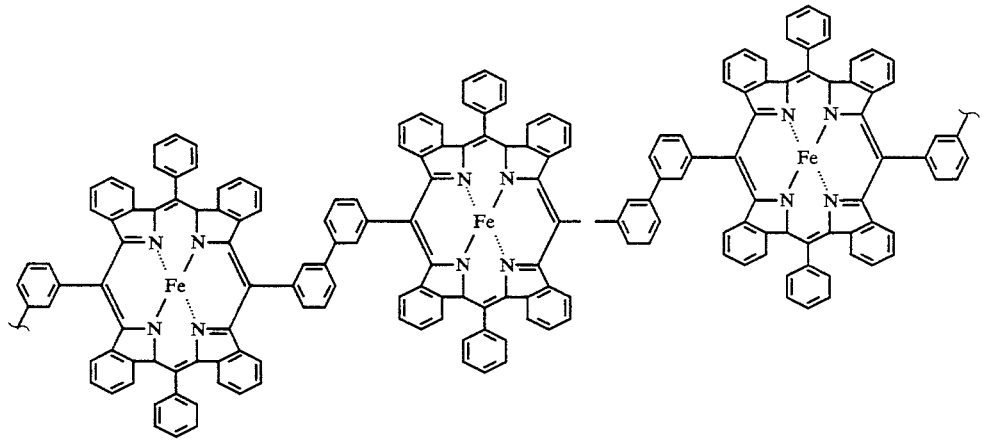

The formed polymer is a poly(iron) tetrabenzporphyrin, wherein

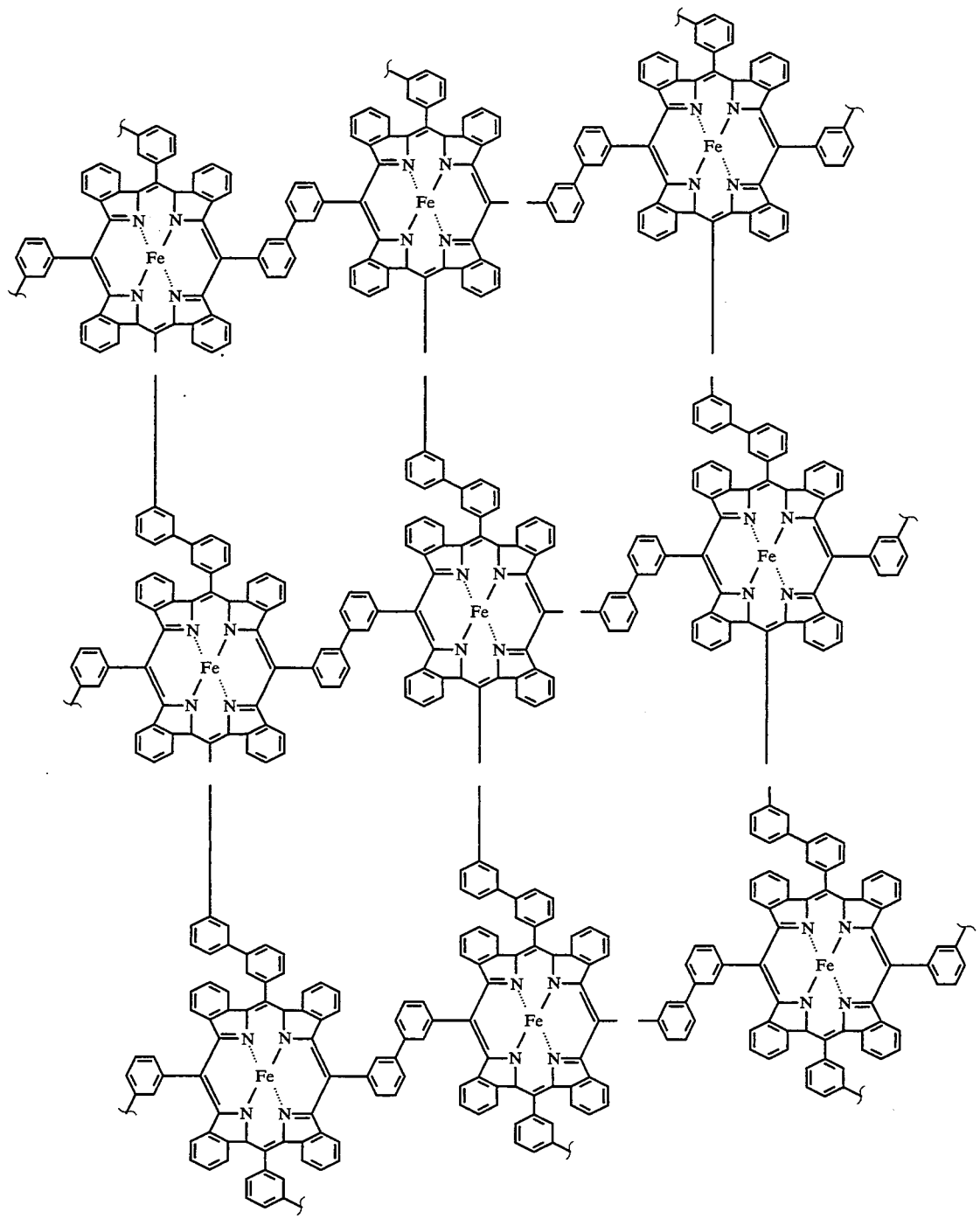

The following specific examples are given as illustrative and should not be considered to be limitative.

EXAMPLE 1

1,4-phenylenebis diphthalimidine is produced in the following manner. 38.6 (0.263 mole) grams of phthalimide and 25 grams (0.12 mole) of 1,4-phenylene diacetic acid and 1 gram of sodium acetate are melted together in a 400 ml. beaker and heated to a temperature of 240° C. with stirring for two hours. Thereafter the solution is cooled to about 100° C. and taken up in ethyl alcohol. The solid material is transferred to a mortar and pulverized. The powder is again treated with ethyl alcohol, filtered, washed with ethyl alcohol and dried to produce the 1,4-phenylenebis diphthalimidine.

EXAMPLE 2

A magnetic nickel complex porphyrin polymer is produced in the following manner. 5 grams (0.014 mole) of the 1,4-phenylenebis diphthalimidine produced according to Example 1 and 9.1 grams (0.041 mole) of 3-benzylidine phthalimidine are mixed with 4.4 grams (0.022 mole) of nickel diacetate and transferred to a 250 ml. 3-neck round bottom flask equipped with a thermometer and a nitrogen gas line. The mixture is heated to 340° C. under a nitrogen atmosphere, during which time the material melts to form a homogeneous solution. After about ½ hour, the melt solidifies. The flask is cooled and the solid is broken up and transferred to a mortar and powdered. The formed nickel complex porphyrin polymer powder exhibits intense magnetic properties.

Example 2 can be repeated, substituting iron diacetate, cobalt diacetate, chromium diacetate and other similar divalent metal acetate salts for the nickel diacetate of Example 2, to produce similar magnetic metal complex polyporphyrin polymers.

EXAMPLE 3

A magnetic iron complex porphyrin polymer is produced in the following manner. 2.5 grams (0.0069 mole) 1,4-phenylenebis diphthalimidine and 4.6 grams (0.021 mole) of 3-benzylidine phthalimidine are mixed with 2.0 grams (0.011 mole) of ferrous oxylate and 0.1 gram of sodium acetate. The mixture was transferred to a 100 ml. 3-neck round bottom flask equipped with a thermometer. The mixture is heated to 320° C. under inert conditions for about 1 hour. The flask is cooled and the solid is broken up and transferred to a mortar and powdered. The formed iron complex porphyrin polymer powder exhibits intense magnetic properties.

EXAMPLE 4

A magnetic iron complex porphyrin polymer is produced in the following manner. 2.5 grams (0.0069 mole) of 1,4-phenylenebis diphthalimidine and 3.1 grams (0.014 mole) of 3-benzylidine phthalimidine are mixed together with 1.3 grams (0.0069 mole) of ferric acetate. The mixture was transferred to a 100 ml. 3-neck round bottom flask equipped with a thermometer. The mixture is heated to 320° C. under inert atmosphere. During the heating process the materials melt to form a homogeneous solution. After about ¾ hour the flask is cooled and the material is transferred to a mortar and powdered. The formed iron complex porphyrin polymer exhibits magnetic properties.

EXAMPLE 5

A magnetic iron complex porphyrin polymer is produced in the following manner. 2.5 grams (0.0069 mole) 1,4-phenylenebis diphthalimidine and 3.05 grams (0.013 mole) of 3-benzylidine phthalimidine are mixed with 1.2 grams (0.0069 mole) ferrous acetate. The mixture was transferred to a 100 ml. 3-neck round bottom flask equipped with a thermometer, and a reflux condenser. To this was added 25 mls. of N-methylpyrrolidinone (NMP). The flask was heated with stirring to reflux. This was continued for about 1 hour. The flask was cooled and the solution was added to 200 mls. of methanol. The precipitate which formed was isolated by vacuum filtration, washed with methanol and dried. The powder thus obtained was magnetic.

EXAMPLE 6

A sample of magnetic polymer synthesized by the method of Example 5 was treated with antimony pentachloride in carbon tetrachloride. The material was isolated and washed with diethyl ether. A film of this material (approx. 2 ml.) was made using pressure. Conductivity measurements were made which showed an initial resistivity of 75–100 ohms per square. In addition to being conductive, the previously observed magnetism was preserved.

EXAMPLE 7

Ferrous acetate (0.194 grams, 0.0011 mole) was mixed with 1.22 grams (0.0034 mole) of 1,4- phenylenebis diphthalimidine and added to a 100 ml. three neck round bottom flask equipped with a thermometer. The flask was heated under inert atmosphere to 320° C. over a period of about one hour. The flask was cooled and the material was removed, broken up and pulverized. The material was observed to be ferromagnetic.

EXAMPLE 8

1,3-phenylenebis diphthalimidine is produced in the following manner. 14.15 grams (0.096 mole) of phthalimide and 9.34 grams (0.048 mole) of 1,3-phenylene diacetic acid and 0.5 gram of sodium acetate are mixed together in a 250 ml. beaker and heated to a temperature of 210° C. to form a yellow homogeneous liquid. The solution begins to effervesce and turns orange. Heating is continued for about 45 minutes. Thereafter the solution is cooled and 200 mls. of ethyl alcohol is added. The formed sludge material is separated out and precipitated in acetone. The solid was pulverized, filtered, washed with acetone and dried to produce the 1,3-phenylenebis diphthalimidine.

EXAMPLE 9

A stepwise linear magnetic iron complex porphyrin polymer is produced in the following manner. 2.6 grams (0.00714 mole) of the 1,3-phenylenebis diphthalimidine produced according to Example 8 and 3.16 grams (0.0142 mole) of 3-benzylidine phthalimidine are mixed with 1.24 grams (0.0074 mole) of ferrous diacetate are mixed together in a 100 mls. 3-neck round bottom flask equipped with a thermometer and an inert gas inlet. The mixture is heated to 260° C. for 1 hour under a nitrogen atmosphere, after which time 100 mls. of dimethylformamide was added to dissolve the crude product. Then 400 mls. of acetone was added to precipitate the polymer. The polymer was filtered, washed with acetone and dried. The formed iron complex porphyrin polymer powder exhibits intense magnetic properties.

Example 9 can be repeated, substituting nickel diacetate, cobalt diacetate chromium diacetate and other similar divalent metal acetate salts for the nickel diacetate of Example 8, to produce similar stepwise linear magnetic metal complex polyporphyrin polymers.

As is apparent from the foregoing examples, the molar ratio of the various reactants used to produce the present magnetic polymers can be varied rather widely, as can the identity of the polyvalent metal salts and/or the salts which supply the aliphatic acid ions. Preferably a single polyvalent metal salt of an aliphatic acid is used, most preferably a divalent metal acetate of nickel, iron, cobalt, manganese or cobalt.

The present metal complex polyporphyrin polymers, due to their natural magnetic properties and their ability to be doped to provide them with electroconductive properties, have numerous potential applications. For example, they provide lightweight replacements for current baseline radar-absorbing materials (RAM) which can substantially reduce the weight of RAM aircraft or of large industrial magnets, motors or other products containing large magnetic components.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

I claim:

1. A process for producing a stepwise linear polymer composition having intense magnetic properties, comprising the steps of:

reacting a phthalimide compound with 1,3-phenylene diacetic acid, in a proportion of about two molar amounts of the phthalimide compound to about one molar amount of the 1,3-phenylene diacetic acid, in the presence of an acetate of a monovalent metal at a temperature of between about 200° to about 260° C. for between about forty-five minutes to about 3 hours, whereby a 1,3-phenylenebis diphthalimidine compound is formed;

cooling, solidifying, and extracting the 1,3-phenylene-bis diphthalimidine compound;

pulverizing, filtering, and washing the extracted 1,3-phenylenebis diphthalimidine compound; and, reacting the extracted 1,3-phenylenebis diphthalimidine compound, a metal acetate salt selected from the group consisting of metal acetate salts of a divalent metal and metal acetate salts of a trivalent metal, and 3-benzylidine phthalimidine at a temperature of between about 260° and about 380° C. under an inert gas atmosphere, whereby the polymer composition having intense magnetic properties is formed.

2. A process as claimed in claim 1, wherein the phthalimide compound is phthalimide.

3. A process as claimed in claim 1, wherein the acetate of a monovalent metal is sodium acetate.

4. A process for producing a stepwise linear polymer composition having intense magnetic properties, comprising the steps of:

reacting a phthalimide compound with 1,3-phenylene diacetic acid, in a proportion of about two molar amounts of the phthalimide compound to about one molar amount of the 1,3-phenylene diacetic acid, in the presence of an acetate of a monovalent metal at a temperature of between about 200° to about 260° C. for between about forty-five minutes to about 3 hours, whereby a 1,3-phenylenebis diphthalimidine compound is formed;

16 cooling, solidifying, and extracting the 1,3-phenylene-bis diphthalimidine compound;

pulverizing, filtering, and washing the extracted 1,3-phenylenebis diphthalimidine compound;

reacting the extracted 1,3-phenylenebis diphthalimidine compound with a metal acetate salt selected from the group consisting of metal acetate salts of a monovalent metal and with a salt of a polyvalent metal and with 3-benzylidine phthalimidine at a temperature of between about 260° and about 380° C. under an inert gas atmosphere, whereby the polymer composition having intense magnetic properties is formed.

5. A process as claimed in claim 4, wherein the metal acetate salt is sodium acetate.

6. A process as claimed in claim 4, wherein the salt of a polyvalent metal is ferrous oxylate.

7. A process as claimed in claim 1, wherein the metal acetate salt is selected from the group consisting of acetate salts of a divalent metal.

8. A process as claimed in claim 7, wherein the metal acetate salt is a metal acetate salt selected from the group consisting of nickel acetate, iron acetate, cobalt acetate, manganese acetate, and chromium acetate.

9. The process as claim in claim 1, wherein the metal acetate salt is selected from the group consisting of acetate salts of a trivalent metal.

10. The process as claimed in claim 9, wherein the metal acetate salt is ferric acetate.

11. The process as claimed in claim 1, wherein the second reacting step further comprises reacting the 1,3-phenylenebis diphthalimidine compound, the metal acetate salt, and the 3-benzylidine phthalimidine in a solvent.

12. The process as claimed in claim 11, wherein the solvent is a solvent selected from the group consisting of N-methylpyrolidinone and dimethylformamide.

13. A stepwise linear polymer composition having the recurring structure

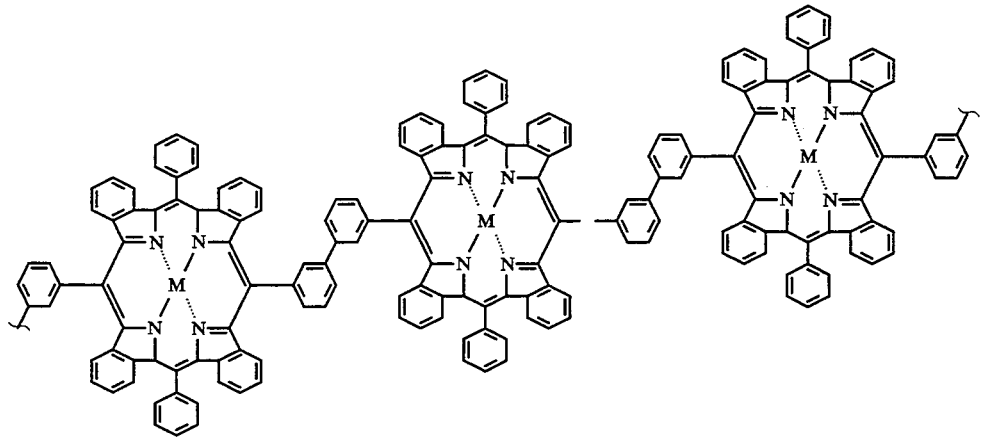

wherein M is a metal selected from the group consisting of divalent metals and trivalent metals.

14. A polymer composition as claimed in claim 13, wherein the metal is selected from the group consisting of nickel, iron, cobalt, manganese, and chromium.

* * * * *